US012619207B2

(12) United States Patent
Hashizume et al.

(10) Patent No.: US 12,619,207 B2
(45) Date of Patent: May 5, 2026

(54) SCADA WEB HMI SYSTEM

(71) Applicant: TOSHIBA MITSUBISHI-ELECTRIC INDUSTRIAL SYSTEMS CORPORATION, Tokyo (JP)

(72) Inventors: Takaharu Hashizume, Tokyo (JP); Akira Nojima, Tokyo (JP); Nobuo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 360 days.

(21) Appl. No.: 18/575,322

(22) PCT Filed: Jun. 21, 2022

(86) PCT No.: PCT/JP2022/024703
§ 371 (c)(1),
(2) Date: Dec. 29, 2023

(87) PCT Pub. No.: WO2023/248339
PCT Pub. Date: Dec. 28, 2023

(65) Prior Publication Data
US 2024/0310802 A1     Sep. 19, 2024

(51) Int. Cl.
*G05B 19/04*     (2006.01)
*G05B 19/042*     (2006.01)
(Continued)

(52) U.S. Cl.
CPC ........... *G05B 19/042* (2013.01); *G05B 19/05* (2013.01); *H04Q 9/00* (2013.01); *G05B 2219/24215* (2013.01); *H04L 67/5651* (2022.05)

(58) Field of Classification Search
CPC ........ G05B 19/042; G05B 2219/24215; G05B 19/05; H04L 67/5651; H04Q 9/00
See application file for complete search history.

(56) References Cited

FOREIGN PATENT DOCUMENTS

| JP | H11-120104 A | 4/1994 |
| JP | 2017-027211 A | 2/2017 |

(Continued)

OTHER PUBLICATIONS

A Setiawan, Sugeng, K I Koesoema, S Bakhri and J Aditya, "The SCADA system using PLC and HMI to improve the effectiveness and efficiency of production processes" (2019), IOP Conf. Series: Materials Science and Engineering 550, pp. 1-9 . (Year: 2019).*

(Continued)

*Primary Examiner* — Rodney A Butler
(74) *Attorney, Agent, or Firm* — XSENSUS LLP

(57)     ABSTRACT
A SCADA server apparatus includes a communication driver, and a client management unit connected to the HMI client apparatuses in one-to-one relationship. The client management unit includes a reception thread receiving signal data transmitted from the communication driver, first and second signal data buffers capable of storing the signal data received by the reception thread in association with a signal data identifier for each data type, and a transmission thread reading out the signal data stored in the first or second signal data buffer and transmitting the read signal data to the HMI client apparatuses. During a period when the transmission thread reads out the signal data from one of the first and second signal data buffers and transmits the signal data to the HMI client apparatuses, the signal data stored in another of the first and second signal data buffers is overwritten.

3 Claims, 13 Drawing Sheets

(51) Int. Cl.
  *G05B 19/05*      (2006.01)
  *H04Q 9/00*      (2006.01)
  *H04L 67/5651*     (2022.01)

(56)          References Cited

FOREIGN PATENT DOCUMENTS

TW      202116045  A    4/2021
TW      202203617  A    1/2022

OTHER PUBLICATIONS

Office Action mailed on Jul. 24, 2023, received for TW Application 112101048, 22 pages including English Translation.
International Search Report and Written Opinion mailed on Sep. 27, 2022, received for PCT Application PCT/JP2022/024703, filed on Jun. 21, 2022, 11 pages including English Translation.

\* cited by examiner

Fig.4B

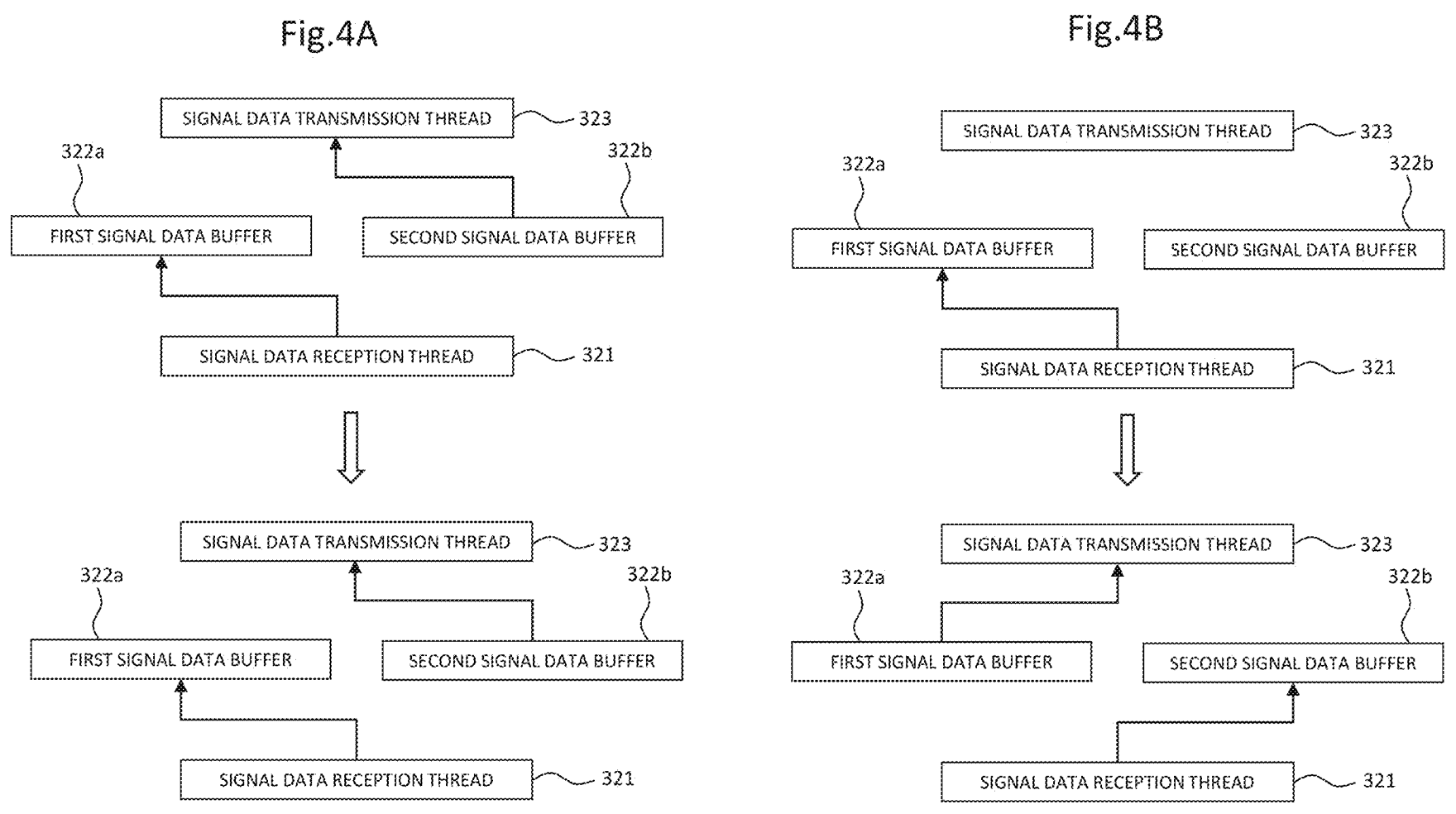

SIGNAL DATA TRANSMISSION THREAD — 323

SECOND SIGNAL DATA BUFFER — 322b

322a — FIRST SIGNAL DATA BUFFER

SIGNAL DATA RECEPTION THREAD — 321

SIGNAL DATA TRANSMISSION THREAD — 323

SECOND SIGNAL DATA BUFFER — 322b

322a — FIRST SIGNAL DATA BUFFER

SIGNAL DATA RECEPTION THREAD — 321

Fig.4A

SIGNAL DATA TRANSMISSION THREAD — 323

SECOND SIGNAL DATA BUFFER — 322b

322a — FIRST SIGNAL DATA BUFFER

SIGNAL DATA RECEPTION THREAD — 321

SIGNAL DATA TRANSMISSION THREAD — 323

SECOND SIGNAL DATA BUFFER — 322b

322a — FIRST SIGNAL DATA BUFFER

SIGNAL DATA RECEPTION THREAD — 321

| Index (signal data) | SCREEN identifier |
|---|---|
| 1 | G1 |
| 2 | G3 |
| 3 | G2, G4 |

Mp2

| CLIENT | SCREEN identifier |
|---|---|
| 4A | G1, G2 |
| 4B | G1, G3 |
| 4C | G1, G4 |

Lc

| Index (signal data) | CLIENT |
|---|---|
| 1 | 4A, 4B, 4C |
| 2 | 4B |
| 3 | 4A, 4C |

SCADA WEB HMI SYSTEM

CROSS-REFERENCE TO RELATED APPLICATION

The present application is based on PCT filing PCT/JP2022/024703, filed Jun. 21, 2022, the entire contents of which are incorporated herein by reference.

FIELD

The present invention relates to a SCADA web HMI system, and in particular to a technique for reducing a processing load in a large-scale system.

BACKGROUND

A SCADA (Supervisory Control And Data Acquisition) is known as a mechanism supervising and controlling a social infrastructure system. The social infrastructure system includes a steel rolling system, a power transmission and transformation system, a water and sewage treatment system, a building management system, a road system, and the like.

The SCADA is a type of industrial control system, and performs system supervision, process control, and data collection by a computer. The SCADA needs quick responsiveness (real-time property) corresponding to processing performance of the system.

The SCADA generally includes the following sub-systems.

(1) HMI (Human Machine Interface)

An HMI is a mechanism that presents data on a supervisory object device to an operator, and enables the operator to supervise and control the supervisory object device.

(2) Supervisory Control System

A supervisory control system includes a Programmable Logic Controller (PLC) and the like. The supervisory control system collects the data on the supervisory object device, and transmits a control command to the supervisory object device.

(3) Remote Input/Output Device (Remote Input Output: RIO)

A remote input/output device is connected to a sensor installed in the supervisory object device, converts a signal of the sensor into digital data, and transmits the digital data to the supervisory control system.

(4) Communication Base

A communication base connects the supervisory control system and the remote input/output device.

As an example of a SCADA HMI sub-system, PTL 1 discloses a system including an HMI client apparatus and an HMI server apparatus. In the existing SCADA such as disclosed in PTL 1, the HMI server apparatus transmits data (input/output signals, and alarm signal) received from the PLC to the HMI client apparatus, and accumulates all of collected data as history data. The input/output signals are signals relating to the supervisory object device (field device group configuring industrial plant), and include an actuator control signal and a sensor detection signal.

CITATION LIST

Patent Literature

[PTL 1] JP 2017-27211 A
[PTL 2] JP H11-120104 A

SUMMARY

Technical Problem

Issues in development of the HMI sub-system that is one of the above-described sub-systems are described.

In the large-scale system, the HMI sub-system connects hundreds of thousands of signals to the PLC in some cases. The existing HMI server apparatus performing both of supervisory control and data collection needs a high-performance processor and a large-capacity memory in order to process the large number of signals in real time. Therefore, it is desirable to realize the HMI sub-system applicable to the large-scale system, at low cost.

To realize low cost of the SCADA HMI sub-system, the inventor of the present application has developed a browser-based SCADA HMI sub-system. This makes it possible to realize an HMI screen as a web application operating on a web browser.

One of advantages of realization of the HMI screen on the web browser is easy acquisition of data from different web servers by switching a URL (including port number).

In other words, data on a history screen can be acquired from an online data gathering (ODG) device that collects and accumulates all of PLC data, and data on a supervisory screen required to have real-time property can be acquired from the HMI server apparatus. A function relating to the history that is a part of SCADA functions is separated and is taken on by the online data gathering device, which enables the HMI server apparatus to specialize in a real-time supervisory function. To process the large number of signals by the low-cost HMI server apparatus, it is desirable to reduce a processing load for the input/output signals (including actuator control signal and sensor detection signal) and the alarm signal.

In the large-scale SCADA web HMI system, it is anticipated that a large number of client apparatuses are connected to one server apparatus. In this case, there is a possibility that the HMI server apparatus cannot perform real-time data processing. For example, when 128 HMI client apparatuses are connected to one server apparatus, and each of the HMI client apparatuses displays the same screen, it is necessary for the HMI server apparatus to receive signal data included in the screen and to transmit the signal data to all of the HMI client apparatuses. In the browser-based SCADA HMI sub-system, the screen on each of the HMI client apparatuses is displayed by a web browser, and the signal data is transmitted from the HMI server apparatus to the HMI client apparatuses by using Point to Point connection such as WebSocket. In other words, multicast transmission cannot be used for transmission from the HMI server apparatus to the HMI client apparatuses. Accordingly, it is necessary for the HMI server apparatus to transmit the signal data of 128 times a received data amount to the HMI client apparatuses.

During a period when a transmission data amount to the HMI client apparatuses per unit time is small, the HMI server apparatus may be able to transmit all of the signal data without delay. However, when the transmission data amount per unit time is increased, the transmission data amount may exceed processing capacity of the HMI server apparatus. In a case where a processing load to the HMI server apparatus is high as described above, the signal data that cannot be transmitted to the HMI client apparatuses remains in a buffer of the HMI server apparatus, and a data buffer size is increased. This causes delay of display update on the screen of each of the HMI client apparatuses, and stoppage of the HMI server apparatus due to reduction of an empty capacity of the memory in the HMI server apparatus. Note that PTL 2 described above discloses a technique in which a load on the network is supervised, and a packet is sorted out in a case where the load is high.

The present proposal is made to solve the above-described issues, and an object of the present proposal is to provide a SCADA web HMI system that can prevent delay of display update on a screen of each of HMI client apparatuses and stoppage of a server apparatus even in a case where a processing load to the server apparatus is high.

Solution to Problem

A first aspect relates to a SCADA web HMI system. The SCADA web HMI system comprises a plurality of programmable logic controllers (hereinafter, PLCs), a plurality of HMI client apparatuses, and one SCADA server apparatus or two SCADA server apparatuses that are connected to one another through a computer network. If the SCADA server apparatus has a redundant configuration, there may be two SCADA server apparatuses. Each of the PLCs transmits block data including a set of input/output signals relating to a field device group configuring an industrial plant, to the computer network at a fixed period. Each of the HMI client apparatuses includes a screen displaying a web browser. The SCADA server apparatus includes a communication driver, and a client management unit connected to the plurality of HMI client apparatuses in one-to-one relationship. The communication driver is configured to receive the block data transmitted from each of the PLCs at the fixed period, to decompose the received block data into signal data for each data type, to add a signal data identifier to the decomposed signal, and to transmit the decomposed signal data to the client management unit for each data type. The client management unit includes a reception thread receiving the signal data transmitted from the communication driver, first and second signal data buffers capable of storing the signal data received by the reception thread in association with the signal data identifier for each data type, and a transmission thread reading out the signal data stored in the first or second signal data buffer and transmitting the read signal data to the HMI client apparatuses corresponding to the read signal data. The SCADA web HMI system is configured that during a period when the transmission thread reads out the signal data from one of the first and second signal data buffers and transmits the signal data to the HMI client apparatuses, the signal data stored in another of the first and second signal data buffers is overwritten.

A second aspect further includes the following characteristics in addition to the first aspect. The reception thread is configured to store the signal data in the first and second signal data buffers using the signal data identifier as an index.

A third aspect further includes the following characteristics in addition to the second aspect. Each of the first and second signal data buffers is configured to include an update flag that is turned on when the stored signal data is updated, in association with the index. The reception thread is configured to generate an index list storing the indexes in which the update flag is ON. The index list is a list representing an update region. The transmission thread is configured to transmit the signal data of the index in which the update flag is ON, namely the signal data in the update region, to the HMI client apparatuses with reference to the index list.

Advantageous Effects of Invention

According to the first aspect, during the period when the transmission thread reads out the signal data from one of the first and second signal data buffers and transmits the signal data to the HMI client apparatuses, it is possible to thin the signal data transmitted to the HMI client apparatuses by updating the signal data stored in the other of the first and second signal data buffers. Accordingly, even in the case where the processing load to the SCADA server apparatus is high, it is possible to prevent delay of display update on the screen of each of the HMI client apparatuses and stoppage of the SCADA server apparatus.

According to the second aspect, it is possible to store or read out the signal data in/from the first and second signal data buffers with a small calculation amount.

According to the third aspect, it is possible to reduce the transmission data amount to the HMI client apparatuses by transmitting only the signal data in the update region to the HMI client apparatuses, and to transmit as many signal data as possible to the HMI client apparatuses.

BRIEF DESCRIPTION OF DRAWINGS

FIGS. 4A and 4B are schematic diagrams to explain signal processing in a client management unit.

FIG. 12 is a schematic diagram to show a client list indicating HMI client apparatus to which signal data should be transmitted.

DESCRIPTION OF EMBODIMENTS

Figure 1:
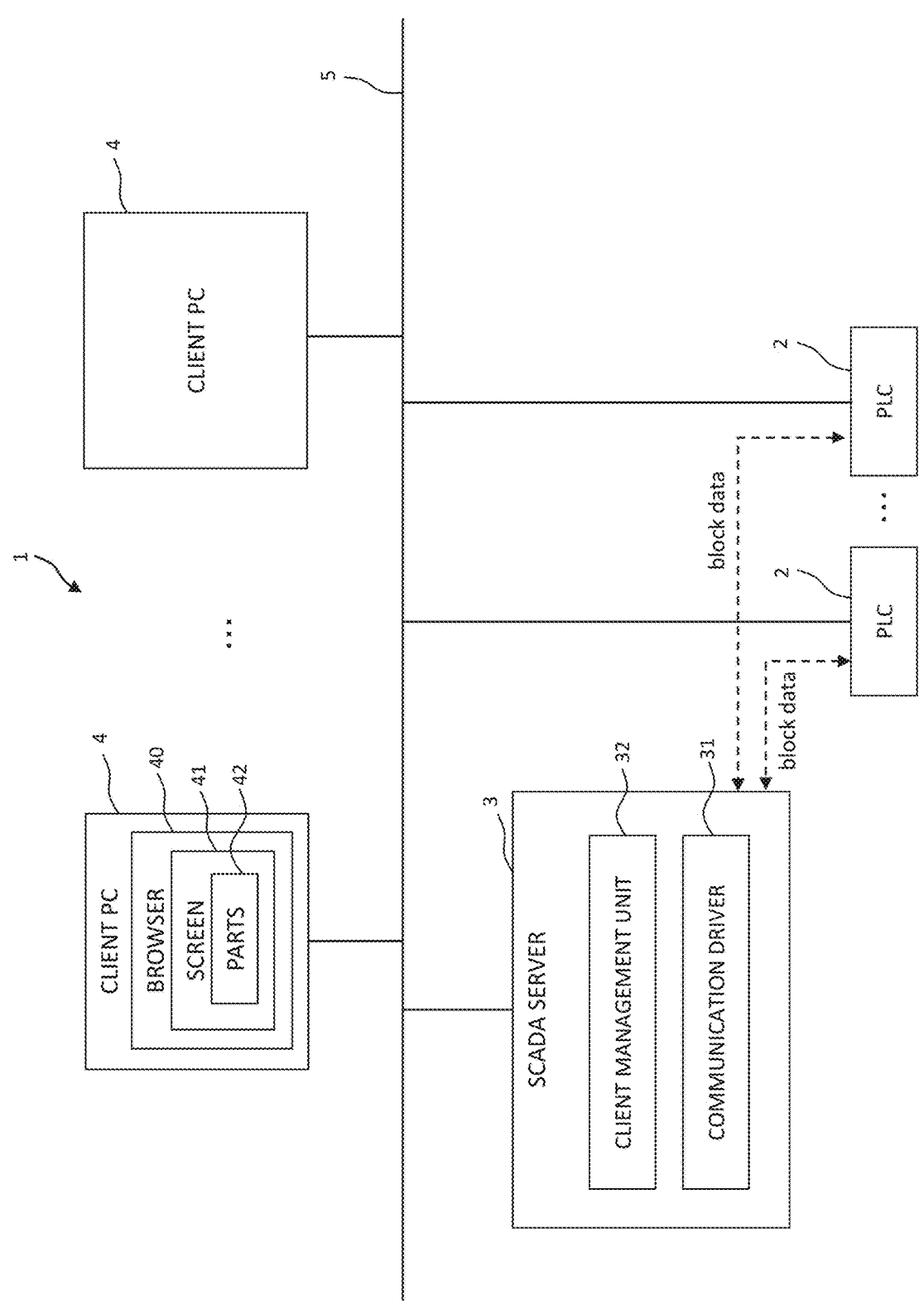
FIG. 1 is a diagram to explain a configuration example of a SCADA web HMI system according to Embodiment 1.

An embodiment of the present invention is described in detail below with reference to drawings. Note that elements common to the drawings are denoted by the same reference numerals, and repetitive descriptions are omitted.

Embodiment 1

1-1. SCADA Web HMI System

FIG. 1 is a diagram to explain a configuration example of a SCADA web HMI system 1 according to Embodiment 1. The SCADA web HMI system 1 includes PLCs 2, a SCADA server apparatus 3, and HMI client apparatuses 4 that are mutually connected through a computer network 5. The computer network 5 is, for example, Ethernet®.

The PLCs 2 are connected to a field device group configuring an industrial plant through an unillustrated control network. The field device group includes an actuator and a sensor. Each of the PLCs 2 transmits a packet including block data to the computer network 5 by multicast or broadcast at a fixed period. A transmission period may be set, for example, within a range from several msec to several hundred msec. The block data is a set of PLC signals. One piece of block data includes several tens to several hundred PLC signals. As types of the PLC signals, there are input/output signals (including actuator control signal and sensor detection signal), and an alarm signal. The block data includes at least one of a set of input/output signals and a set of alarm signals. The block data is periodically transmitted to the SCADA server apparatus 3 irrespective of whether a value of each of the PLC signals is changed from a previous value.

Each of the HMI client apparatuses 4 includes a processor 401, a memory 402, and a monitor 403 illustrated in FIG. 13 described below. The processor 401 is configured to execute a web browser 40 displaying a screen 41 on which display parts 42 are arranged, by executing programs stored in the memory 402. The monitor 403 displays a screen of the web browser 40.

The web browser 40 can acquire various kinds of information on an HTML document relating to the screen 41, from a web server (not illustrated) designated by a URL. The web server is constructed inside the SCADA server apparatus 3. The screen 41 includes a supervisory screen required to have real-time property.

In a case where the screen 41 currently displayed on the web browser 40 is the supervisory screen, the web browser 40 changes display states of the display parts 42 based on the input/output signals received from the SCADA server apparatus 3. Change of the display states indicates, for example, change in numerical values, characters, a color, and a shape. Further, the web browser 40 changes the display states of the display parts 42 arranged on the screen 41 based on the alarm signal received from the SCADA server apparatus 3.

1-2. Outline of Functions of SCADA Server Apparatus

Figure 2:
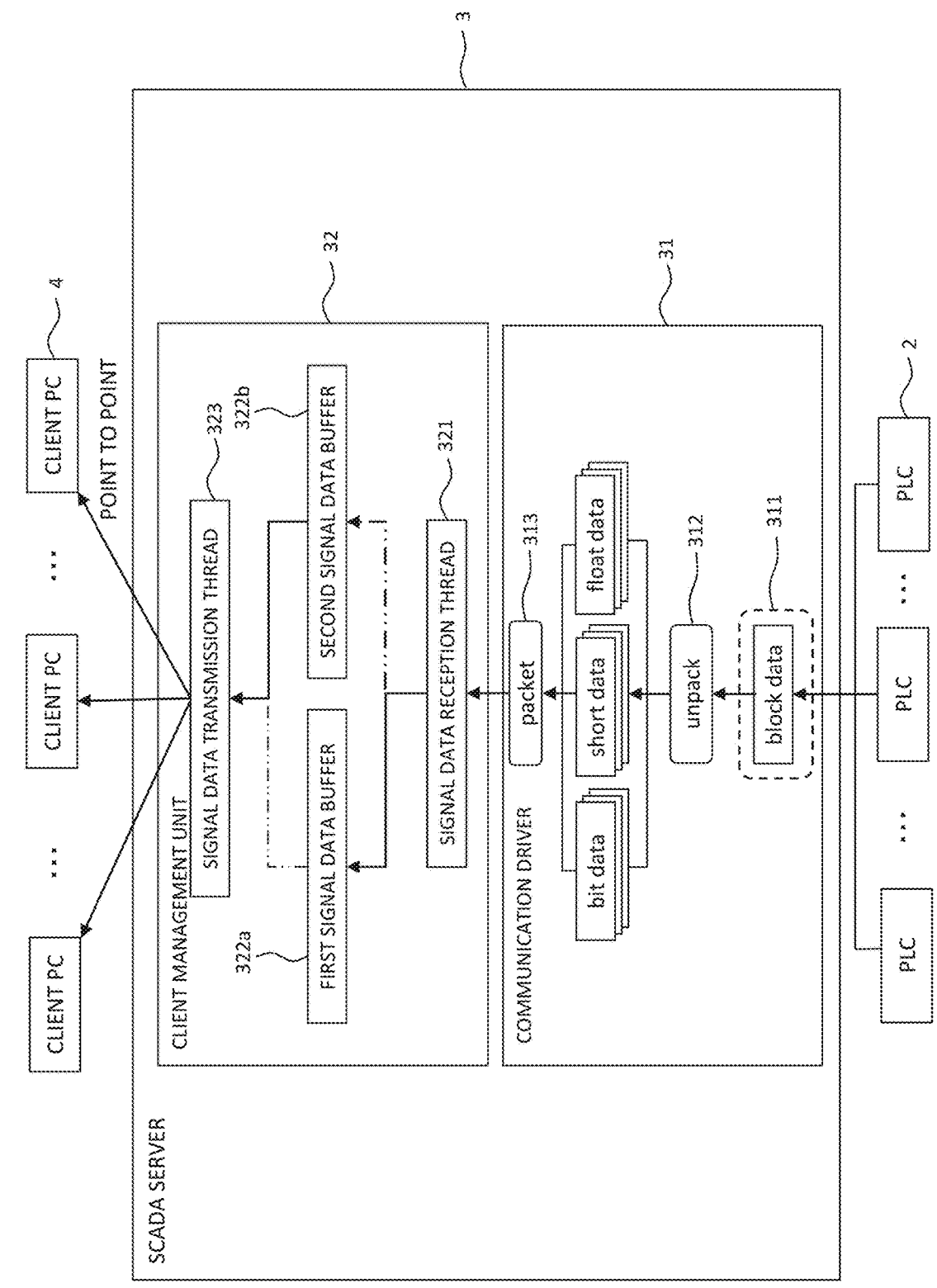
FIG. 2 is a block diagram illustrating outline of functions held by a SCADA server apparatus.

FIG. 2 is a block diagram illustrating outline of functions held by the SCADA server apparatus 3 according to Embodiment 1. The SCADA server apparatus 3 includes a communication driver 31 and a client management unit 32.

The communication driver 31 is configured to perform reception processing 311 for receiving the block data from each of the PLCs 2 at the fixed period, and unpack processing 312 for decomposing the received block data into signal data for each data type. In the present embodiment, an example in which "bit (data size of 1 bit)", "short (data size of 2 bytes)", and "float (data size of 4 bytes)" are used as the data types is described as an example; however, the other data types are usable. Further, the communication driver 31 is configured to perform packet processing 313 for generating a packet for each data type by adding a signal data identifier corresponding to each piece of the signal data, and transmitting the generated packet to the client management unit 32. In other words, the data transmitted from the communication driver 31 to the client management unit 32 is a pair of the signal data identifier and a value of the signal data.

The signal data identifier corresponds to a character string described by an application designer, and is unique to each data type. A data size of the signal data identifier is, for example, 23 bits. Accordingly, the signal data identifier can represent about eight million pieces of signal data for each data type, and can sufficiently support the large-scale SCADA web HMI system 1. In a case of the bit-type data, the signal data identifier is 23 bits, and the value of the data is 1 bit. Therefore, the data size per one signal is 24 bits (=3 bytes). In a case of the float-type data, the signal data identifier is 23 bits, and the value of the data is 4 bytes. Therefore, a padding of 1 bit is added, and the data size per one signal is 7 bytes. Note that, when the packet is generated, only the signal data having the signal data identifier relating to the screen 41 currently displayed on the web browser 40 may be extracted.

The client management unit 32 includes a signal data reception thread 321, a first signal data buffer 322a, a second signal data buffer 322b, and a signal data transmission thread 323.

The signal data reception thread 321 receives the packet (signal data for each data type) received from the communication driver 31. The signal data reception thread 321 uses the signal data identifier as an index in each of the signal data buffers 322a and 322b. Although details are described below, the signal data reception thread 321 stores the signal data in the first signal data buffer 322a or the second signal data buffer 322b.

The first and second signal data buffers 322a and 322b each have the same configuration. In the following, in a case where the signal data buffers 322a and 322b are not distinguished from each other, the signal data buffers 322a and 322b are described as signal data buffers 322 in some cases.

Figure 3:
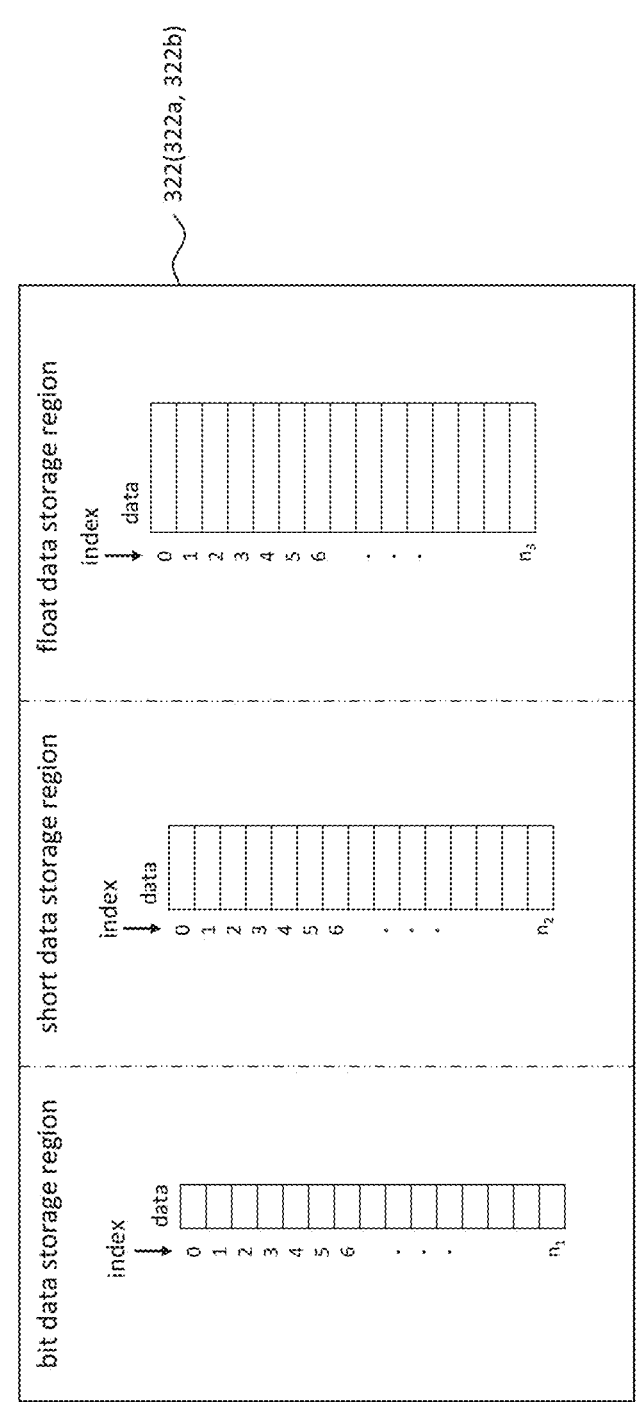
FIG. 3 is a schematic diagram to explain a signal data buffer.

As illustrated in FIG. 3, each of the signal data buffers 322 includes regions (arrays) storing the signal data for the respective data types. In each of the storage regions, the signal data is stored in association with the index. When the signal data buffers 322 are implemented as the signal data type arrays in which the storage regions are allocated to each signal data, it is possible to store or read out the signal data in/from the signal data buffers 322 with a small calculation amount, as compared with a case where the signal data buffers 322 are implemented as associative arrays. This makes it possible to advantageously reduce the load. As compared with the case of using the associative arrays, the memory usage is increased but is allowable in consideration of the specification of the current computer because the memory usage is about 24 Mbytes except for the text type even if eight million pieces of signal data are present.

When receiving an instruction from the signal data reception thread 321, the signal data transmission thread 323 reads out the signal data stored in the first signal data buffer 322a or the second signal data buffer 322b, and transmits the read signal data for each data type to the HMI client apparatuses 4. At this time, the data amount transmitted to the HMI client apparatuses 4 can be reduced by transmitting only the signal data in an update region Ru (see FIG. 8) described below to the HMI client apparatuses 4.

1-3. Signal Data Processing in SCADA Server Apparatus

As illustrated in FIG. 4, when receiving the packet (signal data) from the communication driver 31, the signal data reception thread 321 stores the received signal data in the first signal data buffer 322a. As described above, the data received from the communication driver 31 is the pair of signal data identifier and signal data. Therefore, the signal data reception thread 321 uses the signal data identifier as the index, and stores the data value at an index position in the storage region (array) corresponding to the signal data type. When the data storage is ended, it is checked whether the signal data transmission thread 323 has completed transmission processing.

In a case where the transmission processing is under execution, the signal data reception thread 321 also stores the signal data of the packet received in the next period in the first signal data buffer 322a as illustrated in FIG. 4A. At this time, the data may be overwritten at the same index position. This means that signal data thinning processing is performed in a case where the transmission data amount to the HMI client apparatuses 4 exceeds the processing capacity of the SCADA server apparatus 3, namely, in a case where the processing load to the SCADA server apparatus 3 is high.

In contrast, in a case where the signal data transmission thread 323 has completed the transmission processing, the signal data transmission thread 323 is instructed to read out the signal data stored in the first signal data buffer 322a and to perform the transmission processing, and the signal data of the packet received in the next period is stored in the second signal data buffer 322b, as illustrated in FIG. 4B. After the storage is ended, it is checked whether the signal data transmission thread 323 has completed the transmission processing of the data in the first signal data buffer 322a. When the transmission processing is under execution, the signal data of the packet received in the next period is also stored in the second signal data buffer 322b. At this time, the above-described thinning processing is performed by over-writing the data at the same index position. Thereafter, when the transmission processing of the data in the first signal data buffer 322a is completed, the signal data transmission thread 323 is instructed to read out the signal data stored in the second signal data buffer 322b and to perform the transmission processing. Such reception processing, storage processing, readout processing, and transmission processing are repeatedly performed.

Figure 5:
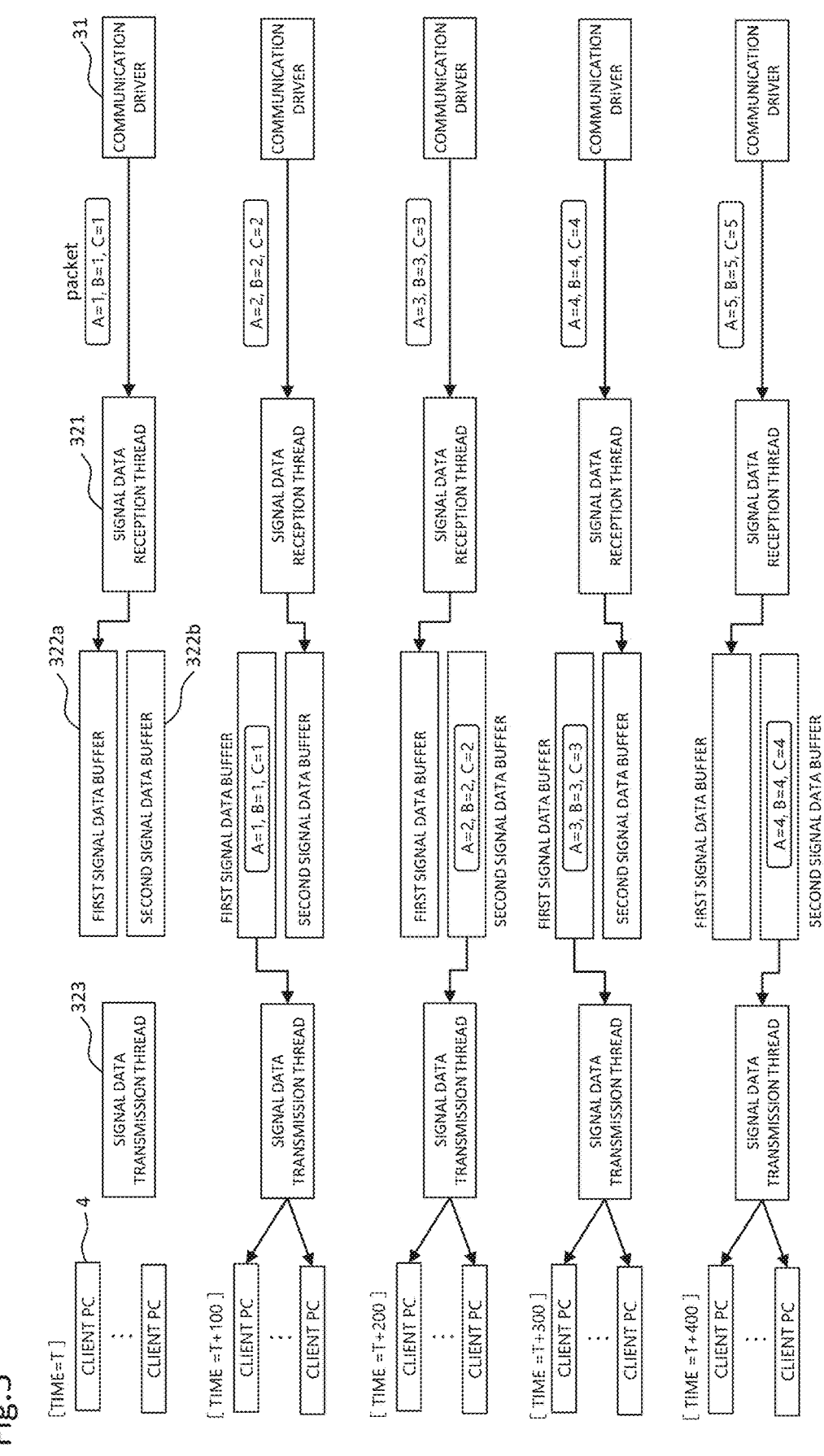
FIG. 5 is a schematic diagram to explain signal processing in the client management unit when load to a signal data transmission thread is low.

The processing by the client management unit 32 in a case where pieces of signal data having respective signal data identifiers A, B, and C included in the packet are incremented by one every 100 msec that is the fixed period, is described as an example with reference to FIG. 5. The signal data identifiers A, B, and C are used as the indexes. Therefore, the indexes are also A, B, and C. Further, it is assumed that the signal data transmission thread 323 can transmit values of respective pieces of signal data with the indexes A, B, and C stored in the first signal data buffer 322a or the second signal data buffer 322b, to all of the HMI client apparatuses 4 within 100 msec. Therefore, in the example illustrated in FIG. 5, the processing load to the SCADA server apparatus 3 is low.

At time T, when the signal data reception thread 321 receives a first packet from the communication driver 31, the respective pieces of signal data (value=1) included in the packet are stored at the positions of the indexes A, B, and C in the first signal data buffer 322a. At time T+100 msec, the signal data transmission thread 323 reads out the signal data (value=1) from the first signal data buffer 322a, and transmits the signal data to the HMI client apparatuses 4. During the transmission, when the signal data reception thread 321 receives a second packet from the communication driver 31, respective pieces of signal data (value=2) are stored at the positions of the indexes A, B, and C in the second signal data buffer 322b.

At time T+200 msec, the signal data transmission thread 323 reads out the signal data (value=2) from the second signal data buffer 322b, and transmits the signal data to the HMI client apparatuses 4. During the transmission, when the signal data reception thread 321 receives a third packet from the communication driver 31, respective pieces of the signal data (value=3) are stored at the positions of the indexes A, B, and C in the first signal data buffer 322a. The client management unit 32 repeats the above-described processing. Therefore, the above-described thinning processing is not performed.

Figure 6:
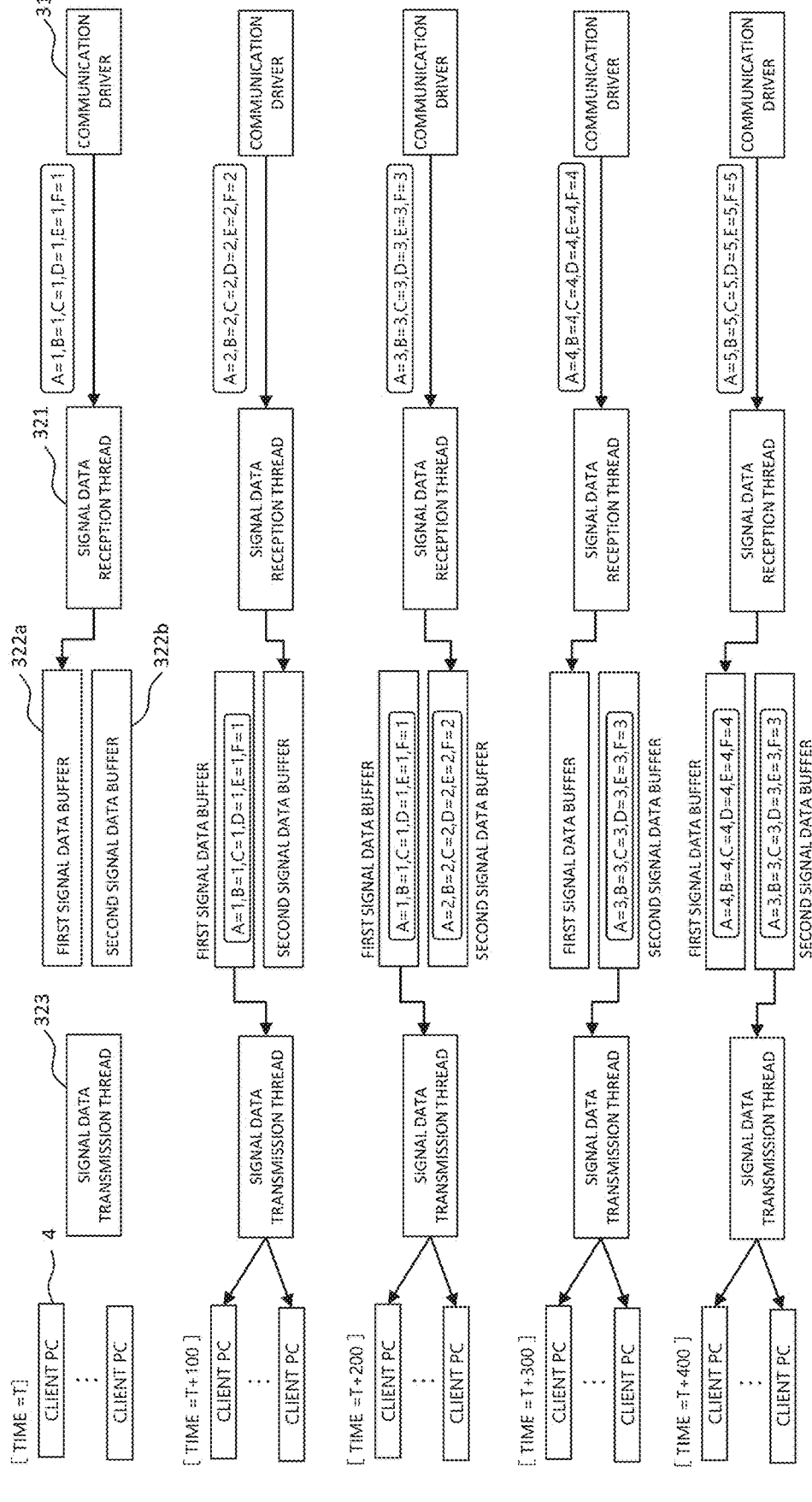
FIG. 6 is a schematic diagram (Part 1) to explain thinning process executed when load to the signal data transmission thread is high.
Figure 7:
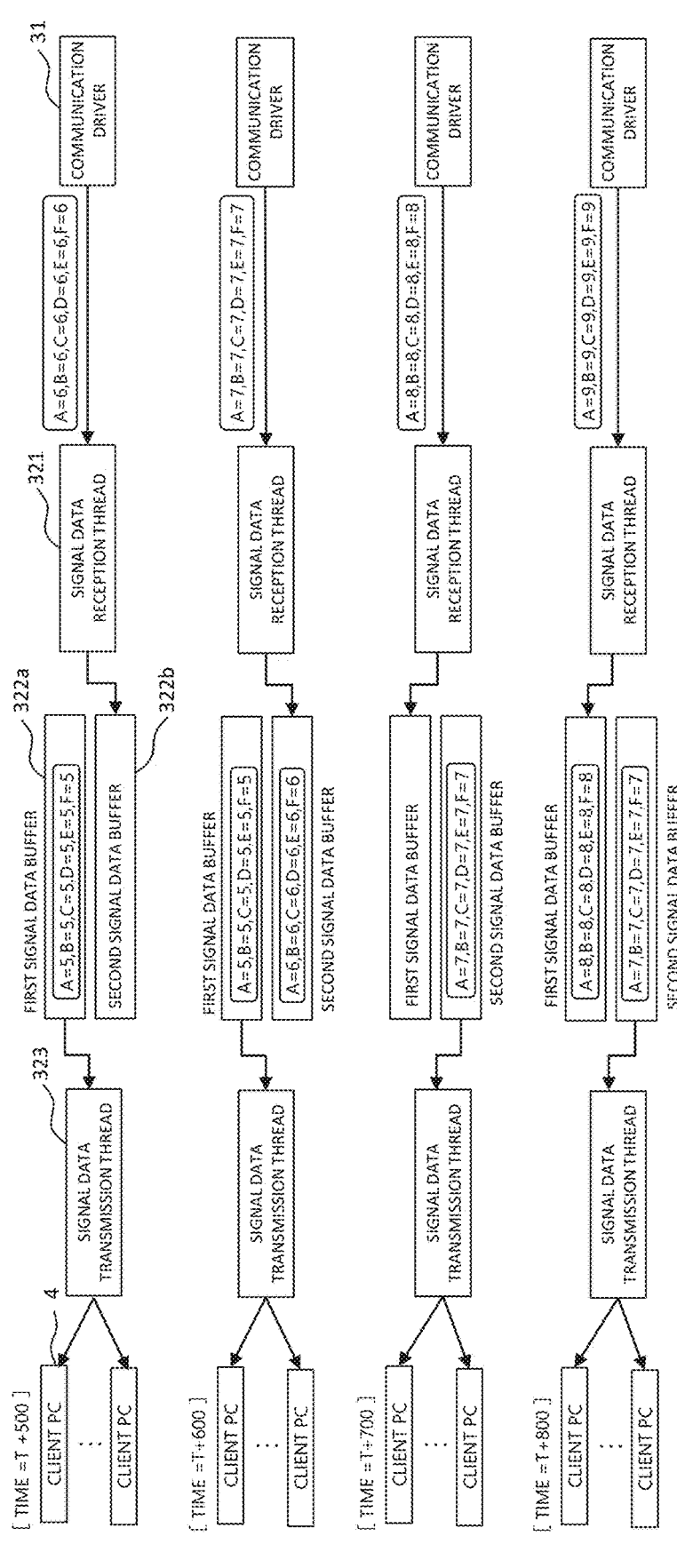
FIG. 7 is a schematic diagram (Part 2) to explain thinning process executed when load to the signal data transmission thread is high.

The processing by the client management unit 32 in a case where the processing load to the SCADA server apparatus 3 is high is described with reference to FIG. 6 and FIG. 7. An example illustrated in FIG. 6 and FIG. 7 is different from the example illustrated in FIG. 5 in that the signal data transmission thread 323 takes 200 msec to transmit values of respective pieces of signal data with indexes A, B, C, D, E, and F stored in the first signal data buffer 322a or the second signal data buffer 322b, to all of the HMI client apparatuses 4. Differences from the example illustrated in FIG. 5 are mainly described below.

At time T+200 msec, when the signal data reception thread 321 receives a third packet, the transmission processing by the signal data transmission thread 323 has not been completed. Therefore, respective pieces of signal data (value=2) stored at positions of the indexes A to F in the second signal data buffer 322b are not transmitted to the HMI client apparatuses 4, and respective pieces of signal data (value=3) are overwritten at the positions of the indexes A to F in the second signal data buffer 322b.

Likewise, at time T+400 msec, the transmission processing by the signal data transmission thread 323 has not been completed. Therefore, respective pieces of signal data (value=4) stored at the positions of the indexes A to F in the first signal data buffer 322a are not transmitted to the HMI client apparatuses 4, and respective pieces of signal data (value=5) are overwritten at the positions of the indexes A to F in the first signal data buffer 322a.

Further, at time T+600 msec, the transmission processing by the signal data transmission thread 323 has not been completed. Therefore, respective pieces of signal data (value=6) stored at the positions of the indexes A to F in the second signal data buffer 322b are not transmitted to the HMI client apparatuses 4, and respective pieces of signal data (value=7) are overwritten at the positions of the indexes A to F in the second signal data buffer 322b.

As described above, based on the performance of the SCADA server apparatus 3 and the data amount transmitted to the HMI client apparatuses 4, the thinning processing in which the signal data in the first signal data buffer 322a or the second signal data buffer 322b is overwritten is auto-matically performed, which adjusts the data amount trans-mitted to the HMI client apparatuses 4.

Figure 8:
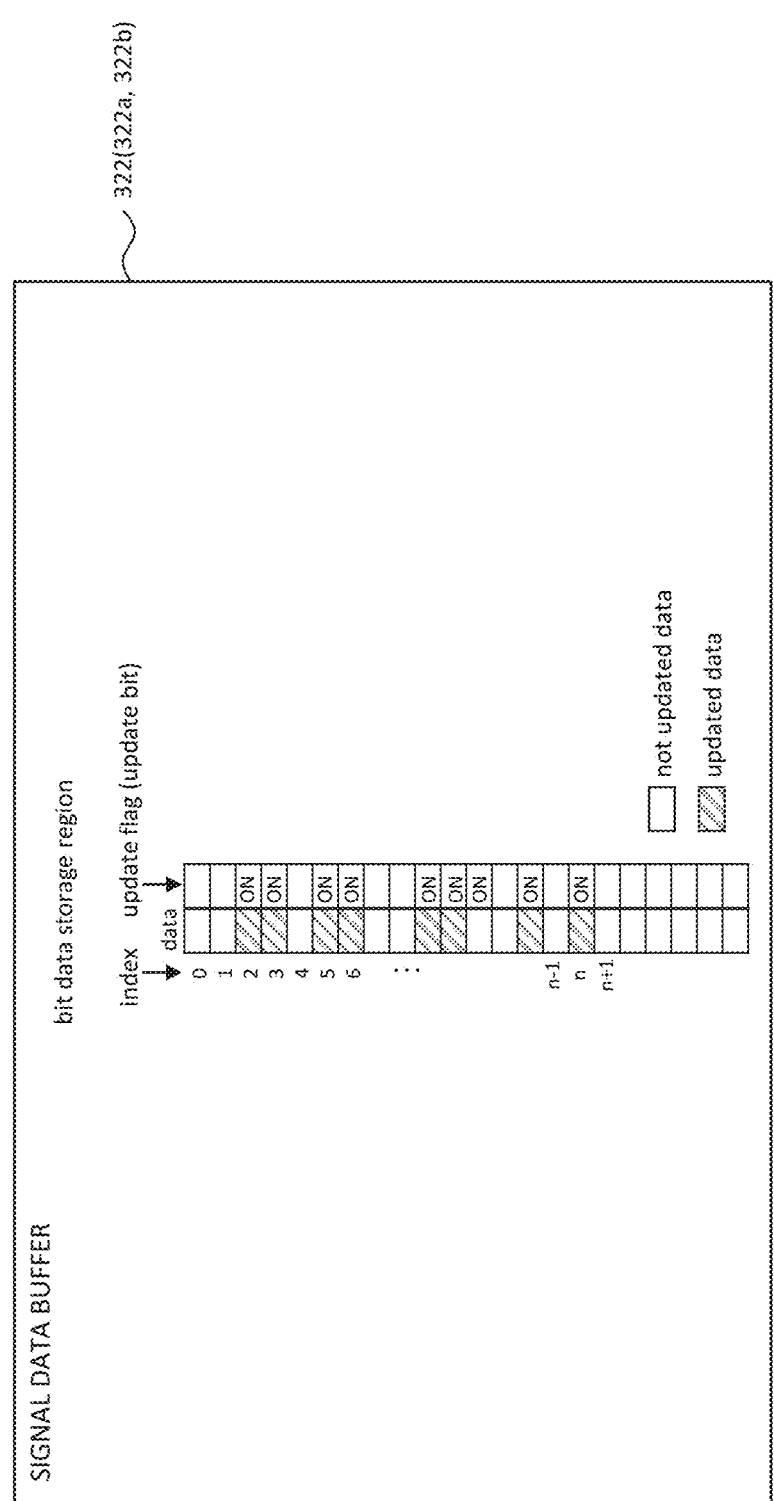
FIG. 8 is a schematic diagram to explain update flag set in the signal data buffer and update region of signal data.
Figure 9:
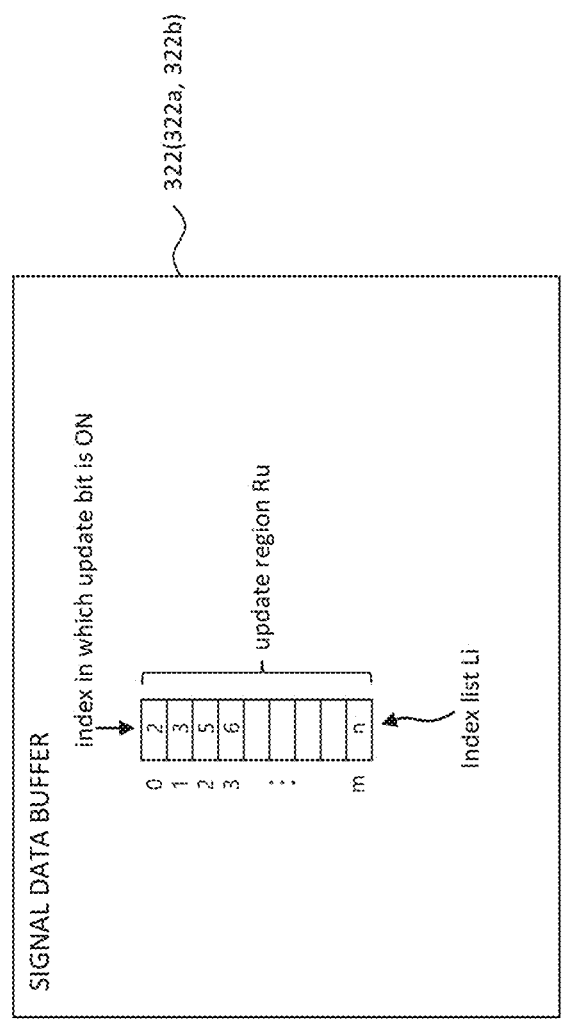
FIG. 9 is a schematic diagram to explain a list representing the update region.

To reduce the data amount transmitted to the HMI client apparatuses 4, each of the signal data buffers 322 may be configured to have an update bit that is turned on when the values of the stored signal data are updated (turned off when values are not updated) as illustrated in FIG. 8. The update bit is an update flag of 1 bit. In this case, the signal data transmission thread 323 may be configured to extract the signal data in which the update bit is ON, from each of the entire signal data buffers 322; however, this is inefficient. Therefore, as illustrated in FIG. 9, the signal data reception thread 321 can be configured to generate an index list Li storing the indexes in which the update flag is ON, and to store the generated index list Li in each of the signal data buffers 322. The index list Li is a list representing the update region Ru. The index list Li may be generated for each data type. Further, the signal data transmission thread 323 can be configured to transmit the signal data of the index in which the update flag is ON, namely, only the signal data in the update region Ru, to the HMI client apparatuses 4 with reference to the index list Li. This makes it possible to efficiently extract the signal data to be transmitted to the HMI client apparatuses 4. As a result, the data amount transmitted to the HMI client apparatuses 4 can be efficiently reduced.

As described above, setting the update region Ru makes it possible to realize efficient transmission of the signal data to the HMI client apparatuses 4. Note that FIG. 8 and FIG. 9 each illustrate the bit-type signal data; however, more efficient transmission of the signal data can be realized by applying the update flag and the index list Li to the signal data of the other data types.

Figure 10:
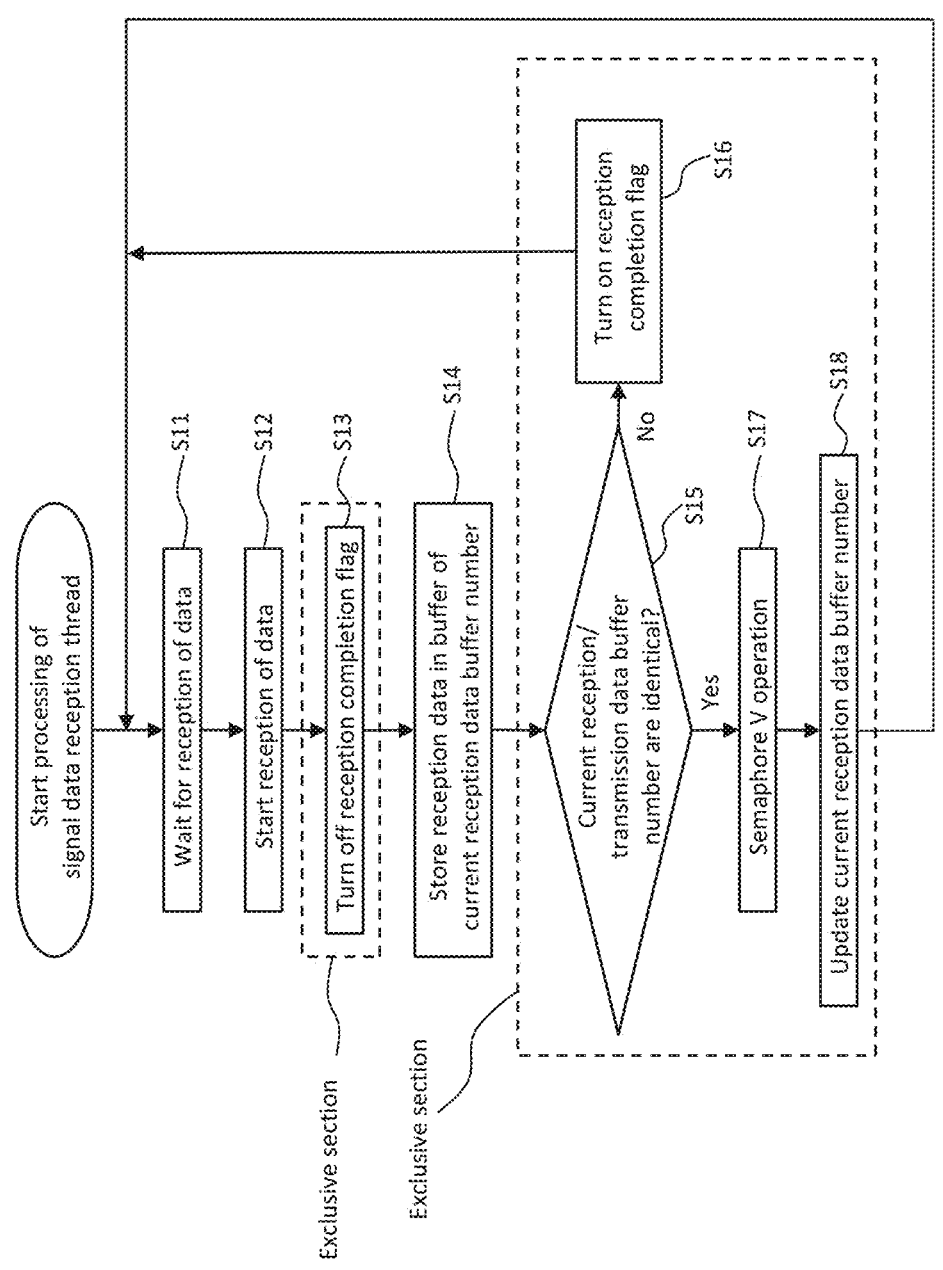
FIG. 10 is a flowchart to explain reception processing performed by a signal data reception thread.

FIG. 10 is a flowchart illustrating an example of a routine of the reception processing performed by the signal data reception thread 321. Note that any one of an exclusive section surrounded by a dashed line in FIG. 10 and an exclusive section illustrated by a dashed line in FIG. 11 described below can be performed. In other words, during execution of the exclusive section by the signal data reception thread 321, execution of the exclusive section by the signal data transmission thread 323 is waited for, whereas during execution of the exclusive section by the signal data transmission thread 323, execution of the exclusive section by the signal data reception thread 321 is waited for.

In the routine illustrated in FIG. 10, reception of the signal data from the communication driver 31 is waited for (step S11). The communication driver 31 transmits the packet including the signal data of the same data type at the fixed period. When reception of the packet is started (step S12), a reception completion flag is turned OFF (step S13). Thereafter, the signal data is stored in the buffer of a current reception data buffer number (step S14). The current reception data buffer number is a number of the signal data buffer in which the signal data is being stored, and indicates the first signal data buffer 322*a* or the second signal data buffer 322*b*. In step S14, as described above, the signal data is stored in association with the index for each data type.

Next, it is determined whether the current reception data buffer number and a current transmission data buffer number in the routine illustrated in FIG. 11 described below are identical with each other (step S15). In a case where the current reception data buffer number and the current transmission data buffer number are not identical with each other, namely, in a case where the transmission by the signal data transmission thread 323 has been completed, the reception completion flag is turned ON (step S16). As a result, the signal data of the packet received next is stored in the signal data buffer different from the current signal data buffer. After step S16, the processing returns to step S11. In contrast, in a case where the current reception data buffer number and the current transmission data buffer number are identical with each other, the processing proceeds to step S17.

In step S17, semaphore V operation is executed. Thereafter, the current reception data buffer number is updated (step S18). As a result, preparation completion of data to be transmitted next is notified to the signal data transmission thread 323. After step S18 is ended, the processing returns to step S11.

Figure 11:
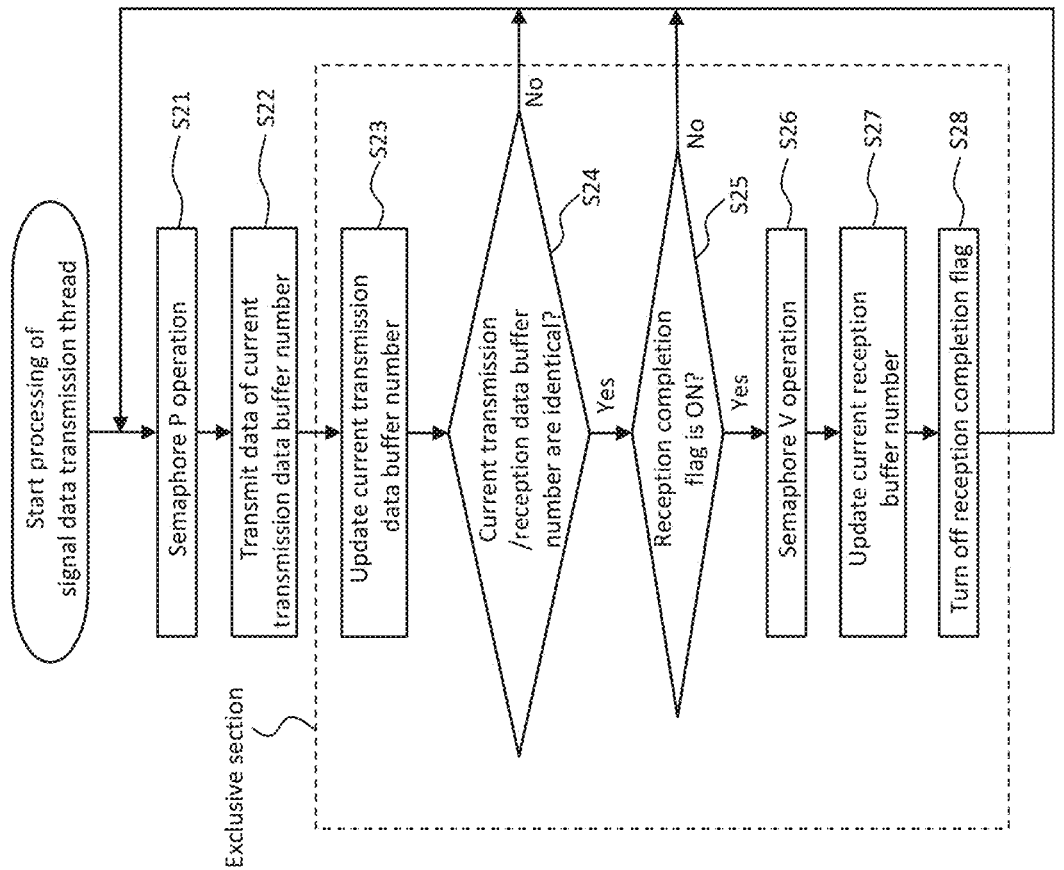
FIG. 11 is a flowchart to explain transmission processing performed by the signal data transmission thread.

FIG. 11 is a flowchart illustrating an example of a routine of the transmission processing performed by the signal data transmission thread 323.

In the routine illustrated in FIG. 11, semaphore P operation is executed (step S21). By execution of the semaphore P operation, preparation completion of the data to be transmitted by the signal data reception thread 321 is waited for. After the operation is resumed, the signal data stored in the buffer of the current transmission data buffer number is transmitted to the HMI client apparatuses 4 (step S22). The current transmission data buffer number is a number of the signal data buffer from which the signal data is being read out, and indicates the first signal data buffer 322*a* or the second signal data buffer 322*b*. In step S22, the signal data of the index in which the update flag is ON, namely, only the signal data in the update region Ru is transmitted with reference to the index list Li illustrated in FIG. 9. As a result, it is possible to reduce the transmission data amount to the HMI client apparatuses 4. This makes it possible to quickly complete transmission of the signal data to the HMI client apparatuses 4.

At this time, with reference to FIG. 12, the signal data transmission thread 323 transmits the signal data in the update region Ru based on a client list Lc defining relationship between the index of the signal data buffer 322 corresponding to the signal data and the HMI client apparatus 4 to which the signal data is to be transmitted. The client list Lc cab be created by using a first map Mp1 that defines relationship between the index and a screen identifier Gn (n=1, 2, . . . ) of the screen 41 using the signal data, and a second map Mp2 defining relationship between the HMI client apparatuses 4 (4A, 4B, and 4C) and the screen identifier Gn.

After step S22, the current transmission data buffer number is updated (step S23). Thereafter, it is determined whether the current transmission data buffer number and the current reception data buffer number in the routine illustrated in FIG. 10 are identical with each other (step S24). In a case where the current transmission data buffer number and the current reception data buffer number are not identical with each other, the processing returns to step S21. In a case where the current transmission data buffer number and the current reception data buffer number are identical with each other, the processing proceeds to step S25.

In step S25, it is determined whether the reception completion flag is ON. In a case where the reception completion flag is OFF, the processing returns to step S21. In contrast, in a case where the reception completion flag is ON, the semaphore V operation is executed (step S26). Thereafter, the current reception data buffer number is updated (step S27). Thereafter, the reception completion flag is turned OFF (step S28), and the processing returns to step S21.

1-4. Hardware Configuration Examples of SCADA Server Apparatus 3 and HMI Client Apparatuses 4

Figure 13:
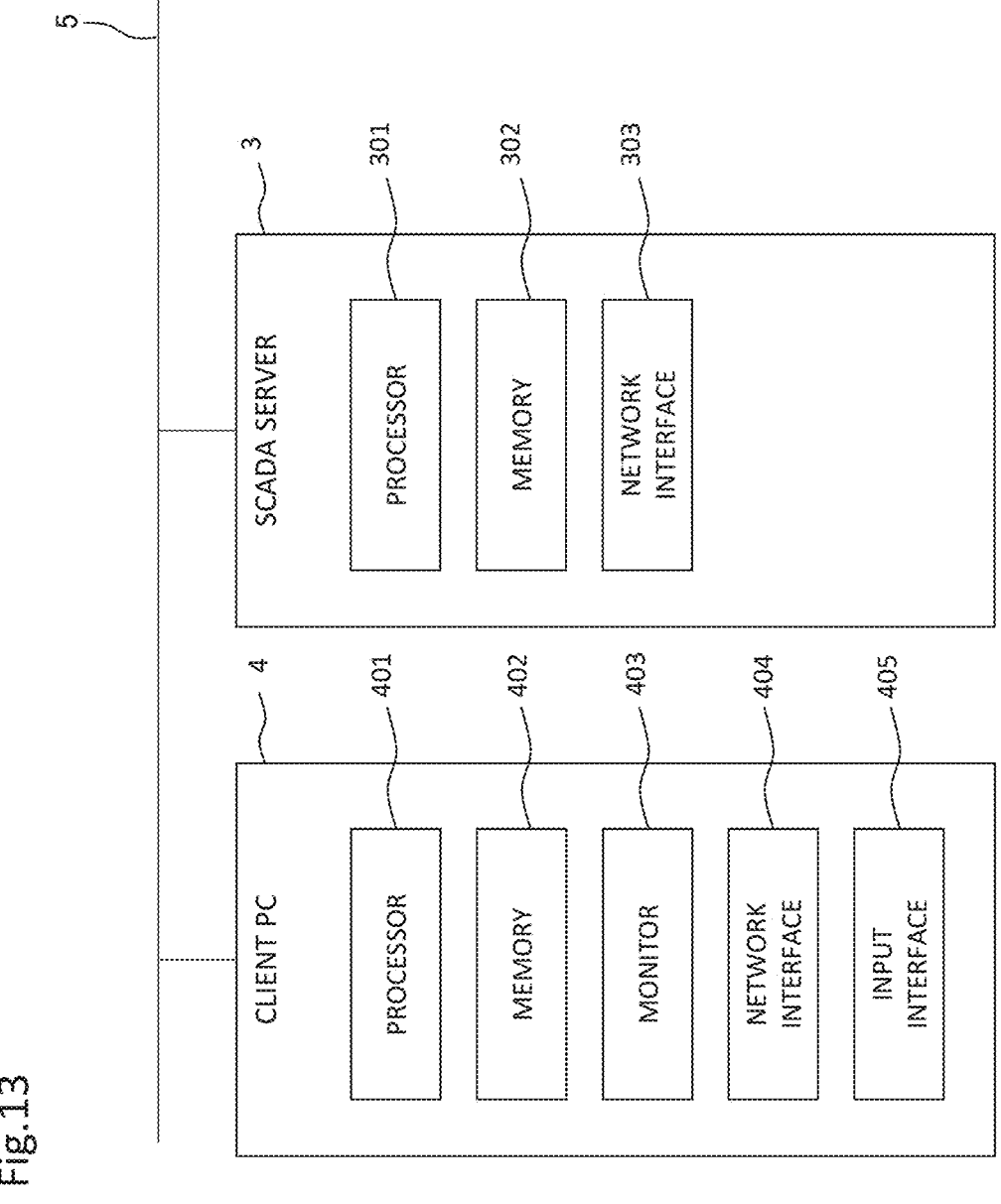
FIG. 13 is a block diagram to show a hardware configuration example of the SCADA server apparatus and the HMI client apparatus.

FIG. 13 is a block diagram illustrating a hardware configuration example of the SCADA server apparatus and each of the HMI client apparatuses. The processing of the above-described SCADA server apparatus 3 is realized by a processing circuit. The processing circuit includes a processor 301, a memory 302, and a network interface 303 that are connected to one another. The processor 301 realizes the functions of the SCADA server apparatus 3 by executing various kinds of programs stored in the memory 302. The memory 302 includes a main storage device and an auxiliary storage device. The memory 302 further includes the first and second signal data buffers 322*a* and 322*b* as storage regions that can temporarily accumulate the signal data.

The processing of each of the above-described HMI client apparatuses 4 is realized by a processing circuit. The processing circuit includes the processor 401, the memory 402, at least one monitor 403, a network interface 404, and an input interface 405 that are connected to one another. The processor 401 realizes the functions of the own HMI client apparatus 4 by executing various kinds of programs stored in the memory 402. The memory 402 includes a main storage device and an auxiliary storage device. A plurality of monitors 403 may be provided. The input interface 405 is an input device such as a keyboard, a mouse, and a touch panel.

1-5. Effects

As described above, according to the present embodiment, during the period when the signal data transmission thread 323 reads out the signal data from one of the first and second signal data buffers 322a and 322b and transmits the signal data to the HMI client apparatuses 4, the signal data transmitted to the HMI client apparatuses 4 can be thinned by overwriting (updating) the signal data stored in the other of the first and second signal data buffers 322a and 322b. This makes it possible to avoid the signal data that cannot be transmitted to the HMI client apparatuses 4 from remaining in the signal data buffers 322 of the SCADA server apparatus 3, and to avoid the empty capacity of the memory of the SCADA server apparatus 3 from being reduced. Accordingly, even in the case where the processing load to the SCADA server apparatus 3 is high, it is possible to prevent delay of the display update on the screen 41 of each of the HMI client apparatuses 4 and stoppage of the SCADA server apparatus 3.

In the thinning processing according to the present embodiment, the latest signal data is not thinned because overwriting is performed. In addition, the data amount of the signal data to be thinned can be reduced as much as possible, which makes it possible to transmit as many signal data as possible to the HMI client apparatuses 4. Accordingly, it is possible to perform the thinning processing by maximally using the system performance of the SCADA web HMI system 1.

Although the embodiment of the present invention is described above, the present invention is not limited to the above-described embodiment, and can be variously modified and implemented without departing from the spirit of the present invention. When numerals of the number, the quantity, the amount, the range, and the like of each of the elements are mentioned in the above-described embodiment, the present invention is not limited to the mentioned numerals except for the case of being particularly clearly mentioned and the case of being obviously specified to the numerals in principle. Further, the structure and the like described in the above-described embodiment are not necessarily essential for the present invention except for the case of being particularly clearly mentioned and the case of being obviously specified to the structure and the like in principle.

REFERENCE SIGNS LIST

1 SCADA web HMI system
2 Programmable logic controller (PLC)
3 SCADA server apparatus
31 communication driver

32 client management unit
321 signal data reception thread
322a first signal data buffer
322b second signal data buffer
323 signal data transmission thread
4 HMI client apparatus
40 Web browser
41 screen
5 computer network
Li index list
Ru update region

The invention claimed is:

1. A SCADA web HMI system comprising a plurality of programmable logic controllers (hereinafter, PLCs), a plurality of HMI client apparatuses, and one SCADA server apparatus that are connected to one another through a computer network, wherein
    each of the PLCs transmits block data including a set of input/output signals relating to a field device group configuring an industrial plant, to the computer network at a fixed period,
    each of the HMI client apparatuses includes a screen displaying a web browser,
    the SCADA server apparatus includes a communication driver, and a client management unit connected to the plurality of HMI client apparatuses in one-to-one relationship,
    the communication driver is configured to receive the block data transmitted from each of the PLCs at the fixed period, to decompose the received block data into signal data for each data type, to add a signal data identifier to the decomposed signal, and to transmit the decomposed signal data to the client management unit for each data type,
    the client management unit includes a reception thread receiving the signal data transmitted from the communication driver, first and second signal data buffers capable of storing the signal data received by the reception thread in association with the signal data identifier for each data type, and a transmission thread reading out the signal data stored in the first or second signal data buffer and transmitting the read signal data to the HMI client apparatuses corresponding to the read signal data, and
    during a period when the transmission thread reads out the signal data from one of the first and second signal data buffers and transmits the signal data to the HMI client apparatuses, the signal data stored in another of the first and second signal data buffers is overwritten.

2. The SCADA web HMI system according to claim 1, wherein the reception thread is configured to store the signal data in the first and second signal data buffers using the signal data identifier as an index.

3. The SCADA web HMI system according to claim 2, wherein
    each of the first and second signal data buffers includes an update flag that is turned on when the stored signal data is updated, in association with the index,
    the reception thread generates an index list storing the indexes in which the update flag is ON, and
    the transmission thread is configured to transmit the signal data of the index in which the update flag is ON, to the HMI client apparatuses with reference to the index list.

* * * * *